(12) United States Patent
Faibish et al.

(10) Patent No.: US 8,825,652 B1
(45) Date of Patent: Sep. 2, 2014

(54) SMALL FILE AGGREGATION IN A PARALLEL COMPUTING SYSTEM

(75) Inventors: Sorin Faibish, Newton, MA (US); John M. Bent, Los Alamos, NM (US); Percy Tzelnic, Concord, MA (US); Gary Grider, Los Alamos, NM (US); Jingwang Zhang, Beijing (CN)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/536,315

(22) Filed: Jun. 28, 2012

(51) Int. Cl.
*G06F 17/30* (2006.01)

(52) U.S. Cl.
USPC ........... 707/737; 707/764; 707/770; 707/809; 707/810

(58) Field of Classification Search
None
See application file for complete search history.

(56) References Cited

U.S. PATENT DOCUMENTS

| | | | | |
|---|---|---|---|---|
| 5,819,295 A | * | 10/1998 | Nakagawa et al. | 1/1 |
| 5,963,962 A | * | 10/1999 | Hitz et al. | 1/1 |
| 6,098,074 A | * | 8/2000 | Cannon et al. | 1/1 |
| 2004/0133577 A1 | * | 7/2004 | Miloushev et al. | 707/10 |
| 2007/0043785 A1 | * | 2/2007 | Cannon et al. | 707/202 |
| 2007/0043789 A1 | * | 2/2007 | Cannon et al. | 707/203 |

OTHER PUBLICATIONS

Bent et al., PLFS: A Checkpoint Filesystem for Parallel Applications, International Conference for High Performance Computing, Networking, Storage and Analysis 2009 (SC09), Nov. 2009.
EMC FAST Cache, http://www.emc.com/collateral/software/whitepapers/h8046-clariion-celerra-unified-fast-cache-wp.pdf, Oct. 2011.

* cited by examiner

*Primary Examiner* — Anh Tai Tran
(74) *Attorney, Agent, or Firm* — Ryan, Mason & Lewis, LLP

(57) ABSTRACT

Techniques are provided for small file aggregation in a parallel computing system. An exemplary method for storing a plurality of files generated by a plurality of processes in a parallel computing system comprises aggregating the plurality of files into a single aggregated file; and generating metadata for the single aggregated file. The metadata comprises an offset and a length of each of the plurality of files in the single aggregated file. The metadata can be used to unpack one or more of the files from the single aggregated file.

22 Claims, 10 Drawing Sheets

FIG. 8A
800

```
class Writer {
private:
      FileObject index_file;
      FileObject data_file;
      FileObject name_file;
      FileID next_id = 1;
      map<string, FileID> name_map;
      string physical_directory;
public:
      int create(char *filename);
      int rename(char *from, char *to);
      int remove(char *filename);
      int open_for_write(char *filename, int trunc);
      int write(char *filename, void *buf, off_t offset, size_t length);
}

Writer::Writer(char *physical_directory) {
      this->physical_directory = physical_directory;
      foreach file (index_file, data_file, name_file) {
            file = file.append(TS,HN,PID)
            open(O_CREAT,file)
      }
}
```

*FIG. 8B*

```
Writer::~Writer() {
    foreach file in (index_file, data_file, name_file) {
        file.sync();
        file.close();
    }
}

Writer::create(char *filename) {
    name_file.append([CREATE, strlen(filename), timestamp, filename]);
    name_map[filename] = next_id;
    next_id++;
}

Writer::remove (char *filename) {
    name_file.append([DELETE, strlen(filename), timestamp, filename]);
    name_map.erase(filename);
    next_id++;
}
```

810 { create block }
820 { remove block }

*FIG. 8C*

```
//rename(dir1/file1,/dir2/file2) is tricky and not handled here, it will be
implemented as copy(/dir1/file1,/dir2/file1) + delete(/dir1/file1).
Writer::rename(char *from, char *to) {
        sprintf(buf, "%s/%s", from, to);
        name_file.append([RENAME, strlen(from) + strlen(to) + 1, timestamp, buf]);
        if (name_map.find(from) != name_map.end()) {
                name_map[to] = name_map[from];
                name_map.erase(from);
        }
        next_id += 1;
}

Writer::open_for_write(char *filename, int trunc) {
        if (trunc) {
                name_file.append([OPEN_TRUNC, strlen(filename), timestamp, filename]);
                name_map[filename] = next_id;
                next_id++;
                return;
        }
        if (name_map.find(filename) == name_map.end()) {
                name_file.append([OPEN, strlen(filename), timestamp, filename]);
                name_map[filename] = next_id;
                next_id++;
        }
}

Writer::write(char *filename, void *buf, off_t offset, size_t length) {
        FileID fid = name_map[filename];
        off_t physical_offset = data_file.append(buf, length);
        index_file.append([fid, offset, length, physical_offset, timestamp]);
}
```

- 830: Writer::rename block
- 840: if (trunc) block in open_for_write
- 850: second block in open_for_write

FIG. 9

```
//mapping filename-> a list of (index file's id, this file's fid in it);
map<string, list<pair<FileID, int>>> SmallFileContainer::Names;

struct NameRecord {
        int dropping_id;
        int operation;
        char *filename;
        timeval timestamp;
        FileID fid;
};
int
SmallFileContainer::load_and_merge(vector<NameRecord> sorted_records) {
        for (int i = 0; I < sorted_records.size(); i++) {
                NameRecord *record = &sorted_records[i];
                switch( record->operation ) {
                case CREATE:
                case OPEN:
                        Names[record->filename].push_back(make_pair(record->fid,
                        record->dropping_id));
                        break;
                case DELETE:
                        Names.erase(record->filename);
                        break;
                case OPEN_TRUNC:
                        Names[record->filename].clear();
                        Names[record->filename].push_back(make_pair(record->fid,
                        record->dropping_id));
                        break;
                case RENAME:
                        //get the filenames renamed from and renamed to
                        parse_rename_record(record, &from, &to);
                        if (Names.find(from) != Names.end()) {
                                dropping_id = Names[from];
                                Names.erase(from);
                                Names[to] = dropping_id;
                        }
                        break;
                }
        }
}
```

```
class AggregatedFD {
private:
        SmallFileContainer *container;
        string filename;
        index index;
public:
        int read(void *buf, off_t offset, size_t length);
        int write(void *buf, off_t offset, size_t length);
}

//When the FD is created, its member variables (except index) should
   be setup properly.
AggregatedFD::read(void *buf, off_t offset size_t length) {
        list<FileID, string> dropping_files = container->Names[filename];
        for each of dropping_files as (fid, index_name) {
                index.load_and_merge(fid, index_name);
}
do {
        indexEntry result;
index.globallookup(offset, length, &result);
read_from_datafile(&result...);
} while (remaining data to read);
}

AggregatedFD::write(void *buf, off_t offset, size_t length) {
        Container->Writers[pid].write(filename, buf, offset, length);
}
```

1010 brackets the read function body.

SMALL FILE AGGREGATION IN A PARALLEL COMPUTING SYSTEM

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. One particular parallel computing application models the flow of electrons within a cube of virtual space by dividing the cube into smaller sub-cubes and then assigning each sub-cube to a corresponding process executing on a compute node.

Distributed parallel computing, however, is prone to failure as a failure of an individual compute node will interrupt the entire computation. Thus, fault tolerance techniques, such as checkpoint techniques, are often employed to store the current state of each process to persistent storage. After a failure, the application can then restart from the most recent checkpoint. The checkpoints are typically performed synchronously in time for each process.

There are a number of ways to organize the data streams when multiple processes simultaneously save data to a shared parallel storage system. For example, each process can create a single file across a set of different directories and then sequentially write a large amount of data to the single file. In a further implementation, a single process can create a shared file, and then all the processes write to the shared file in large segments that are aligned with block boundaries within the parallel file system.

When multiple processes create multiple small files concurrently, however, the performance of the parallel storage system will be impaired. Serialization can cause significant performance degradation as the parallel processes must remain idle while they wait for one another. Serialization is incurred when the parallel file system locks a shared object (such as a file or a directory) in order to maintain the consistency of the shared object. When multiple processes simultaneously try to create files in a shared directory, the directory must be locked so that multiple create operations on the directory do not collide.

Non-sequential access to the physical disk drives in the parallel storage system can also impair access pattern performance. When multiple small files are concurrently written, it is very challenging for the parallel file system to place the data into sequential regions of the disk. This type of access pattern can cause the disk to frequently switch the write position in a seek disk operation. Disk access patterns that incur many seek operations tend to perform an order of magnitude more poorly than patterns that do not incur seek operations.

A need therefore exists for improved techniques for storing multiple small files from a large number of clients concurrently accessing a shared storage system.

SUMMARY

Embodiments of the present invention provide improved techniques for small file aggregation in a parallel computing system. In one embodiment, a method for storing a plurality of files generated by a plurality of processes in a parallel computing system comprises the steps of aggregating the plurality of files into a single aggregated file; and generating metadata for the single aggregated file, wherein the metadata comprises an offset and a length of each of the plurality of files in the single aggregated file.

The plurality of processes can be running, for example, on a plurality of compute nodes. The single aggregated file is optionally provided to a middleware virtual file system and/or one or more hard disk drives for storage. According to another aspect of the invention, the metadata can be used to unpack one or more of the files from the single aggregated file. Generally, the metadata characterizes a layout of the files within the single aggregated file.

Advantageously, illustrative embodiments of the invention provide small file aggregation using a parallel log file system. Small file aggregation reduces data processing and transfer bandwidth costs, and preserves valuable disk space.

These and other features and advantages of the present invention will become more readily apparent from the accompanying drawings and the following detailed description.

BRIEF DESCRIPTION OF THE DRAWINGS

FIGS. 8A through 8C, collectively, illustrate exemplary pseudo code for the Writer of FIG. 6;

FIG. 9 illustrates exemplary pseudo code for a names mapping construction process; and FIG. 10 illustrates the pseudo code for creating an aggregated file descriptor.

DETAILED DESCRIPTION

The present invention provides improved techniques for storing multiple small files from a large number of clients concurrently accessing a shared storage system. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

According to one aspect of the invention, small file aggregation is employed to reduce the overhead involved in the creation of small files. Generally, the small file data for many small files is buffered, for example, in a middleware file system located on the compute client. The aggregated small files are then sequentially written to disk in a much smaller number of physical objects. In this manner, the random creation of small files is transformed into sequential write operations to a large file by buffering the small files in memory and then writing relatively fewer files in large chunks.

In one exemplary embodiment, the middleware file system that aggregates the small files is implemented using the Parallel Log-Structured File System (PLFS), as modified herein to provide the features and functions of the present invention. See, for example, John Bent et al., "PLFS: A Checkpoint Filesystem for Parallel Applications," Intl Conf. for High Performance Computing, Networking, Storage and Analysis 2009 (SC09) (November 2009), incorporated by reference herein. Generally, conventional PLFS improves the efficiency of checkpoint techniques for parallel applications by inserting an interposition layer into the existing storage stack to rearrange the problematic access pattern associated with checkpoints.

In addition, due to the placement of PLFS as a middleware file system on the client, PLFS can aggregate the large number of small files into a smaller number of large files.

Small File Aggregation

Figure 1:
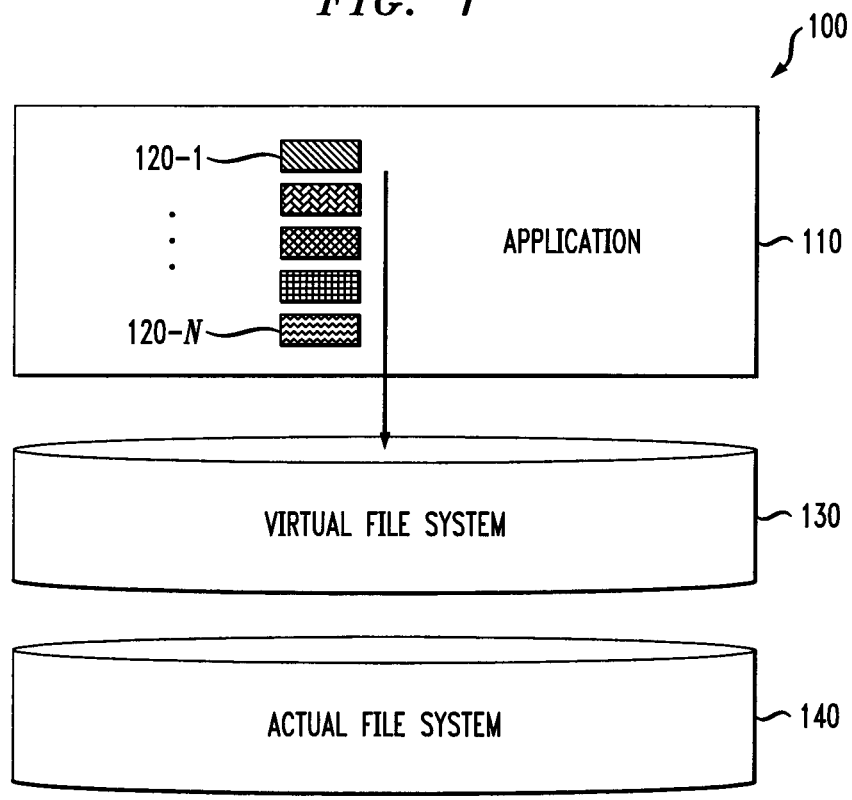
FIG. 1 illustrates an exemplary compute node within a parallel computing system.

FIG. 1 illustrates an exemplary compute node 100 within a parallel computing system. As shown in FIG. 1, the exemplary node 100 comprises an application 110 that generates a plurality of files 120-1 through 120-N (collectively referred to herein as files 120). The application 110 provides the files 120 to a middleware virtual file system 130, such as PLFS. The middleware virtual file system 130 then stores the files 120 in an actual file system 140, comprised of one or more hard disk drives. The middleware virtual file system 130 may comprise, for example, a burst buffer (e.g., flash memory) to aggregate the small files.

In the exemplary embodiment, a daemon of the PLFS middleware virtual file system 130 runs on each node 100 to intercept each request by each process (or application) on the node 100. The PLFS middleware virtual file system 130 then captures the data for each write operation and packages (i.e., aggregates) multiple write operations into a single write operation of an aggregate file.

The rate of metadata creation for each individual file 120 is significant and imposes latency between the creation of each small file. The present invention recognizes that many file systems perform better for large sequential writes to a single file as opposed to many small writes to many small files. This is typically because writes to small files 120 may cause physical "seeks" of the disk head media. These seeks can take, for example, 10 milliseconds. Sequential access, however, can operate at rotational speeds that are an order of magnitude faster.

Figure 2:
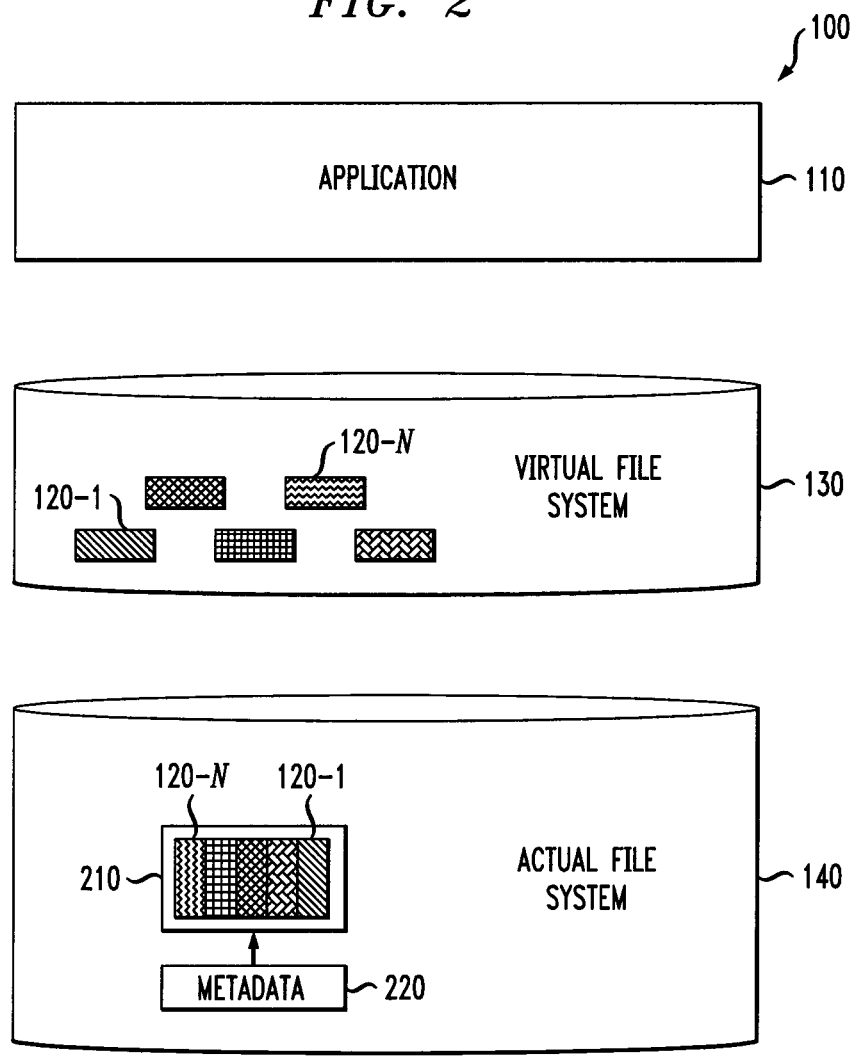
FIG. 2 illustrates the exemplary node of FIG. 1 in accordance with an aspect of the present invention.

FIG. 2 illustrates the exemplary node 100 of FIG. 1 in accordance with an aspect of the present invention. As shown in FIG. 2, the middleware virtual file system 130 aggregates the files 120 by sequentially writing the files 120 into an aggregated file 210. The aggregated file 210 is then written to the actual file system 140, together with metadata 220. The metadata 220 is generated, for example, by the middleware virtual file system 130 and may be comprised of, for example, an offset and a length of each small file 120 in the aggregated file 210. The offset and length of each small file 120 provides an index that subsequently allows each small file 120 to be found in the aggregate file 210. The index optionally also comprises a timestamp that provides two functions: resolution in case of subsequent overwrites as well as a modification timestamp provided to the user when the user asks for the file access history. Finally, the index comprises an identifier (id) of each small file, which id can be looked up in the name file (discussed below) to find the file name. These lookups, which could otherwise result in disks seeks, can optionally be avoided by caching the index and name files, which are small and will fit in memory.

Note that typical file systems also will write to multiple physical locations on disk for the creation of a small file. The directory entry must be modified; the file needs an inode which may or may not fit in the directory entry; and the file data may go to a third block.

In this manner, the present invention improves file system performance for workloads comprised of the sequential creation of multiple small files 120. The virtual file system layer 130 rearranges the logical workload (multiple small files 120) into a physical workload more amenable to the performance characteristics of the backing file system. The logical file system view that the user expects is preserved so that the performance improvement is gained in a manner that is transparent to the user. In the exemplary embodiment, file data and associated metadata for a large number of files 120 are stored in three actual files 210, 220 (plus the name file). The smaller files in the aggregate file 210 are unpacked as necessary (as discussed below) to satisfy read and lookup operations.

The virtual file system preserves the expected view of the created files 120. Physically, however, the data is rearranged into a single large file 210, which was written sequentially. The smaller metadata file 220 describes the layout of the data within the large file 210, so that the data can be reconstructed for read and lookup operations. This reorganization, transparent to the application 110, allows the underlying storage system 140 to achieve the full potential bandwidth of the disk storage due to the sequential nature of the workload. It is noted, however, that two files are written: the data file 210 and the metadata file 220. Read access will first consult the metadata file to discover the appropriate location within the data file for a particular region of data. This lookup can be avoided with a small buffer for the metadata 220, which can be a small amount of data.

Figure 3:
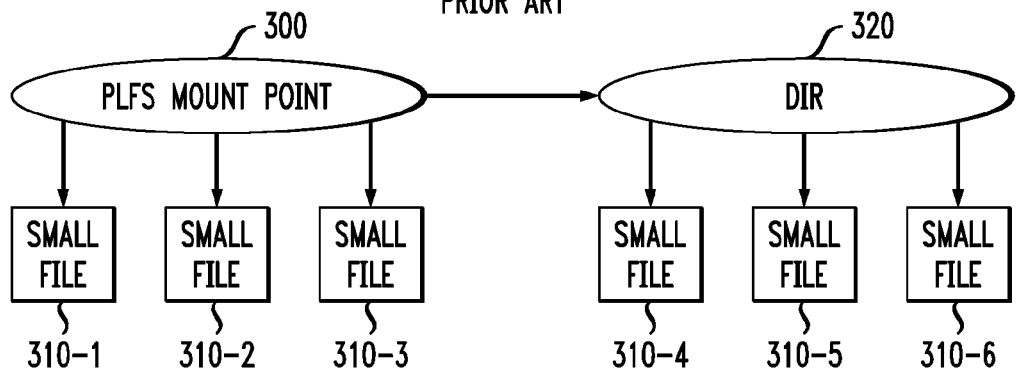
FIG. 3 illustrates an exemplary conventional PLFS logical file system.

FIG. 3 illustrates an exemplary conventional PLFS logical file system 300. As shown in FIG. 3, the exemplary PLFS logical file system 300 comprises six files 310-1 through 310-6 and one directory 320.

Figure 4:
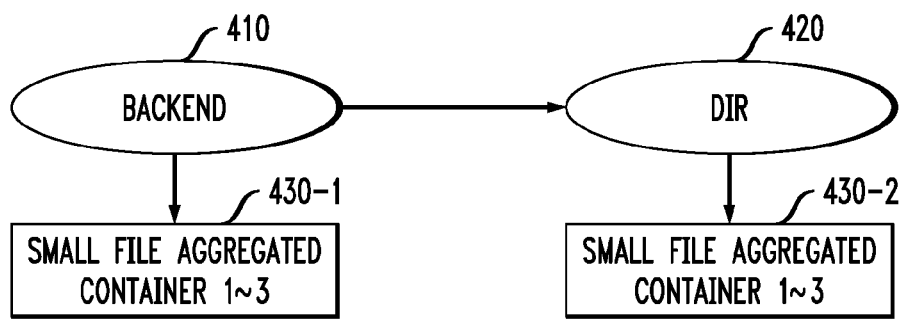
FIG. 4 illustrates the aggregation of the exemplary PLFS logical file system of FIG. 3 in accordance with the present invention.

FIG. 4 illustrates the aggregation of the exemplary PLFS logical file system 300 of FIG. 3 in accordance with the present invention. As shown in FIG. 4, the small files in the same directory are aggregated into a small file aggregated container structure 430. In particular, small files 310-1 through 310-3 under the directory PLFS mount point 300 are aggregated into a first small file aggregated container 430-1. Similarly, small files 310-4 through 310-6 under the directory 320 are aggregated into a second small file aggregated container 430-2. As discussed hereinafter, the small file aggregated container structures 430 are directories with a similar structure to PLFS container files.

Figure 5:
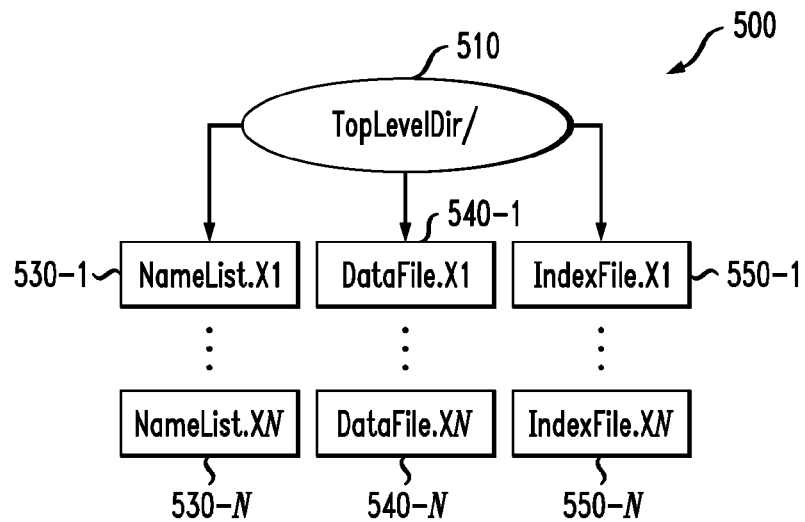
FIG. 5 illustrates an exemplary internal structure of the small file aggregated containers 430 of FIG. 4.

FIG. 5 illustrates an exemplary internal structure 500 of the small file aggregated containers 430 of FIG. 4. As shown in FIG. 5, the exemplary internal structure 500 comprises a top level directory 510 and for each small file i in the aggregated small file, a name list file 530-i, a data file 540-i, and an index file 550-i. The name list file 530 identifies the associated small file by name, the data file 540 contains the actual data of the associated small file and the index file 550 comprises a pointer (i.e., an offset into the data file) to the actual data. An exemplary format for the name list file 530 is discussed further below in a section entitled "Physical Layout of Name List File."

Consider P processes running on H compute nodes, F small files are written to the PLFS file systems, and the PLFS systems have B backends. Then, with small file aggregation in accordance with the present invention, the small file aggregated container will be created on every backend (B), every compute node may have a hostdir.x in each backend (B*H), every process will create three files in the hostdir.x directory it hashed to (2*P), so the total number of files or directories that will be created can be expressed as follows:

$$T=B+B*H+3*P$$

Each backend will contain (1+H+3P/B) files.

In all instances in which the number of files per process is greater than three, the total number of files in each backend will be less than a regular file system. In addition, every process could write the filename and index to the index file and write the data to data file. Thus, there is no need to share a file between processes.

Physical Layout of Name List File

In one exemplary embodiment, the name list files 530 record all operations on file names. In this manner, the list of files in this directory could be restored later. In addition, the name list file 530 must support create, rename and remove operations. A list of records will be appended to the name list file 530 when a new file is created or an old file is deleted or renamed. All records in the name list file 530 have the following exemplary format:

| operation | length | time stamp | file name |
| --- | --- | --- | --- | where the exemplary operation field comprises 4 bytes enumeration (CREATE, DELETE, OPEN, OPEN_TRUNC, RENAME); the exemplary length field comprises 4 bytes to indicate the length of the file name without the ending zero; the exemplary time stamp comprises 8 bytes that records the time stamp of the operation to resolve potential conflicts; and the exemplary file name comprises a variable length indicating the name of the associated file.

Thus, after checking all the records in the name list file 530, the list of file names in this name list file 530 can be constructed. In addition, all of the files in a directory can be listed after reading and parsing all name list files 530. The name list files 530 and the index files 550 correspond to the metadata 220 of FIG. 2.

Small File Aggregated Container Data Structure

Figure 6:
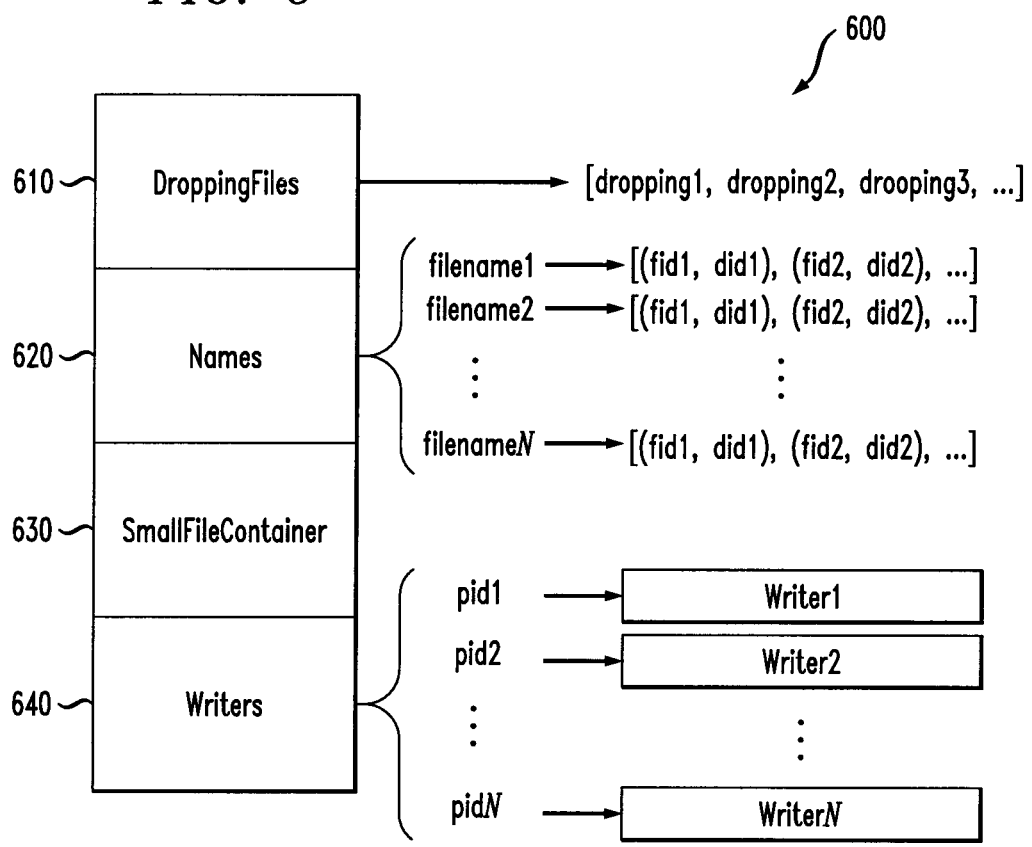
FIG. 6 illustrates an exemplary aggregated small file data structure for the small file aggregated containers of FIG. 4.

FIG. 6 illustrates an exemplary aggregated small file data structure 600 for the small file aggregated containers 430 of FIG. 4. The exemplary aggregated small file data structure 600 supports read and write operations to small files in the small file aggregated containers 430. The exemplary aggregated small file data structure 600 comprises a dropping files field 610, a names field 620, a small file container index field 630 and a writers field 640. The dropping files field 610 identifies any physical files (or sub-files) stored by the underlying file system, such as PLFS, in a known manner.

The names field 620 corresponds to the name lists 530 of FIG. 5 and is used for lookup and read operations. The lookup operation is important to the small file aggregated containers 430. Each time a file is opened, created, renamed or removed, the existence of the file should initially be checked in the small file aggregated containers 430. Thus, once the small file aggregated container 430 is created, all the name list files 530 in backend file systems will be loaded to memory so that the name list can be created. In addition, the name list can optionally be cached in memory so that later lookups do not require disk access.

As shown in FIG. 6, the name list 620 in memory is a mapping from each file name to its index and data files (did) and its file identifier (fid) in that index file, so that the data can be restored based on those index and data files.

The small file container index field 630 corresponds to the index files 550 of FIG. 5. As shown in FIG. 6, the writers field 640 identifies the writer process associated with each process (identified by a process identifier (pid)). The information in the writers field 640 is used to identify the writer for write operations and other modifications.

The writer is the data structure for making modifications to this aggregated small file data structure 600. The writer will be created when the process wants to make modifications to the aggregated small file data structure 600 (such as create a new file, open an existing file for write, rename or remove a file). The writer remains in memory as long as possible and it will not be deleted until the aggregated small file data structure 600 is deleted.

The aggregated small file data structure 600 must exist before modifications are made to this directory or regular files are accessed.

Figure 7:
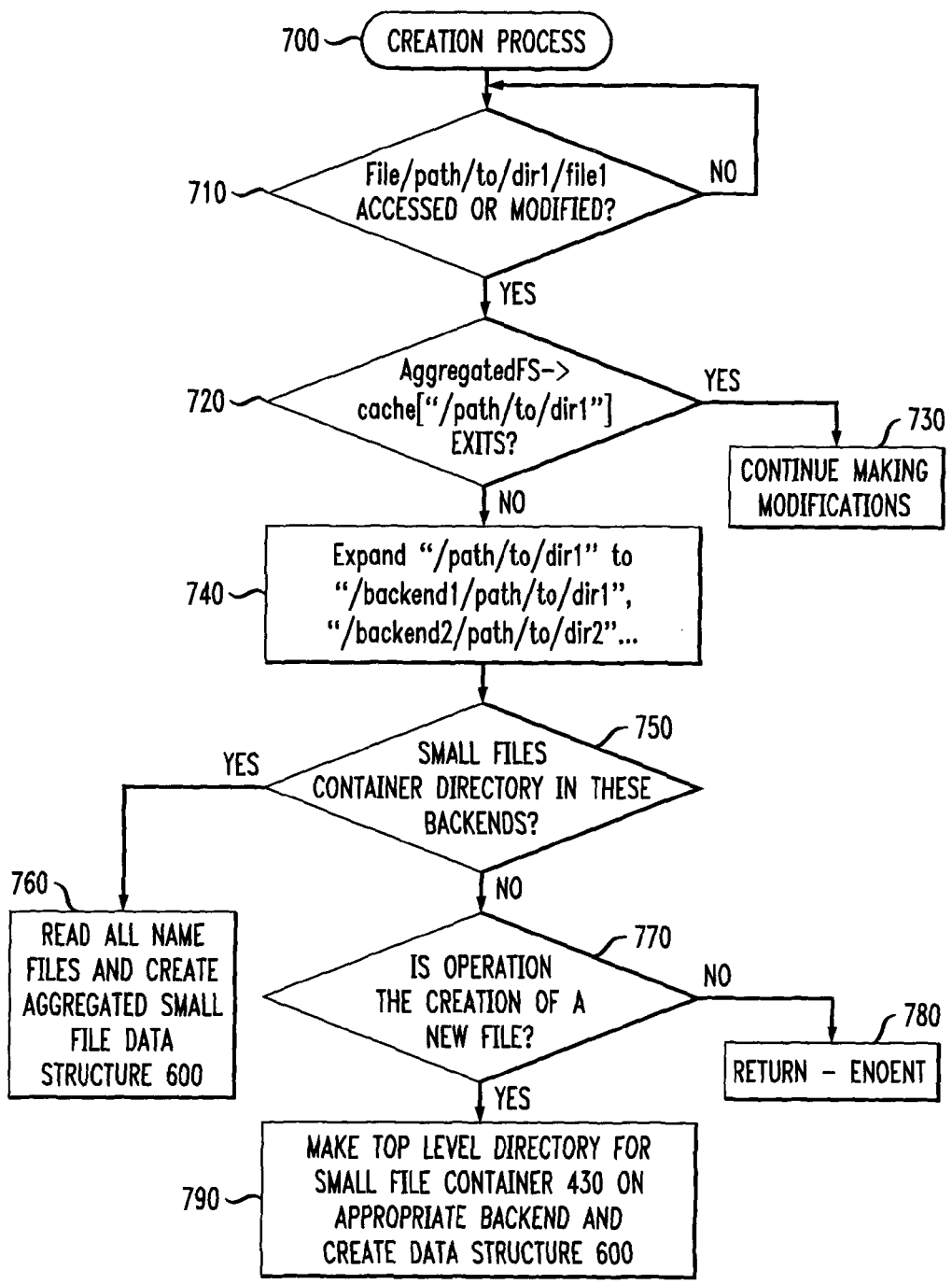
FIG. 7 is a flow chart describing an exemplary creation process for obtaining an aggregated small file data structure of FIG. 6.

FIG. 7 is a flow chart describing an exemplary creation process 700 for obtaining an aggregated small file data structure 600. As shown in FIG. 7, the creation process 700 begins during step 710 once a file /path/to/dir1/file1 is accessed or modified.

A test is performed during step 720 to determine if the AggregatedFS->cache["/path/to/dir1"] exists. If it is determined during step 720 that AggregatedFS->cache["/path/to/dir1"] exists, then modifications continue during step 730, as discussed below. If, however, it is determined during step 720 that AggregatedFS->cache["/path/to/dir1"] does not exist, then "/path/to/dir1" is expanded to "/backend1/path/to/dir1", "/backend2/path/to/dir2" . . . during step 740.

A test is performed during step 750 to determine if the small files container directory is in these backends. If it is determined during step 750 that the small files container directory exists in these backends, then all name files are read during step 760 and the aggregated small file data structure 600 is created.

If, however, it is determined during step 750 that the small files container directory does not exist in these backends, then a further test is performed during step 770 to determine if the operation creates a new file.

If it is determined during step 770 that the operation does not create a new file, then—ENOENT (No such file or directory) is returned during step 780 and the process 700 stops (a file in an empty directory is being accessed). If, however, it is determined during step 770 that the operation creates a new file, then make the top level directory for small file container 430 on the appropriate backend during step 790 and create a new aggregated small file data structure 600 in memory.

Thus, the process generates an aggregated small file data structure 600 for the operations discussed below.

Modification Procedures

As indicated above, whenever a process P writes into a logical directory Y, the process P creates three files: Z/data.X, Z/index.X, and Z/names.X where Z is the physical directory as returned by expandPath( ) and X is a unique identifier (e.g., timestamp plus hostname plus pid). The names files 530, 630 will contain a set of filenames that P wrote in directory Y.

When a new Writer is added to PLFS, the Writer 640 will create three files and record the following modifications to these three files.

FIGS. 8A through 8C, collectively, illustrate exemplary pseudo code 800 for the Writer 640. As shown in FIG. 8B, the exemplary pseudo code 800 comprises a create function 810 to open a new file and a remove function 820 to remove a file.

As shown in FIG. 8C, the exemplary pseudo code 800 comprises a rename function 830 to rename an existing file. Section 840 creates and replaces a file while section 850 adds a new file after determining it does not already exist.

Loading and Merging Name List Files

When the PLFS is trying to load the small file aggregated containers 430 to memory, the PLFS will read all dropping files in the backend file systems. In addition, the PLFS will obtain a list of dropping files 610, such as dropping.data.X, dropping.index.X and dropping.names.X, where X is a unique identifier.

First, a vector of these dropping files 610 is created. The vector contains all the dropping files 610 in the backends containers 430. The vector will be referred as "Droppings" below. Then, all name list files 530, 620 will be read to obtain a list of operation records. The exemplary list of operation records contains:

dropping_id: If it is read from Droppings[i], then the dropping_id is 'i';

operation: CREATE, REMOVE, OPEN, OPEN_TRUNC, RENAME_FROM or RENAME_TO;

filename: The name of the file operated on;

timestamp: The timestamp stored in this name list file; and file_id: Its id in this name list file.

In order to resolve potential conflicts, all of these lists of operation records will be sorted based on the timestamp. In addition, based on these lists of operation records, the Names mapping 620 in the small file container structure 600 could be constructed as shown in FIG. 9.

FIG. 9 illustrates exemplary pseudo code 900 for a names mapping construction process 900. After load_and_merge( ) during line 910, the Names mapping 620 can be constructed and the regular files in this directory can find all the index files that contain its data and its file id in those index files by investigating the result of SmallFileContainer.Names[filename].

File Descriptor and Related Operations

The file descriptor AggregatedFD has an Index for reading, and it will use the SmallFileContainer.Writers[pid] to perform modifications. The Index for reading is constructed from a list of index and data files and the file identifiers in each of them. The list can be obtained from SmallFileContainer.Names[its filename].

The data of this file can be constructed in a similar manner as the container mode of the PLFS, all index entries of it will be read from its index files and then those entries will be merged together to get the latest view of its data.

FIG. 10 illustrates the pseudo code 1000 for AggregatedFD. When the AggregatedFD is created, its member variables (except index) are setup in section 1010.

File Truncation

The truncation operation in small file aggregation is similar to container mode in a conventional PLFS with some minor changes.

Even if a file is truncated to zero, the corresponding dropping files 610 cannot be deleted or truncated to zero, because the dropping files 610 may contain some index entries of other logical files. The dropping files 610 may be shared between different logical files and cannot be deleted when one of the logical file is truncated to zero. Otherwise, another file may be corrupted.

There are no metadata files for aggregated small files. As a result, there is no place to store the latest size of a file. Thus, every time when the size of a file is needed, all of its index files need to be read.

If two or more logical files in the same directory are truncated concurrently by different processes, a locking mechanism should be deployed to prevent concurrently writing the index files, which may lead to data corruption.

While many existing file systems use a minimum of 4,000 bytes to store each file, the disclosed small file aggregation approach can use significantly less memory. The disclosed small file aggregation approach uses a small constant number of bytes (e.g., less than 100 bytes) for the necessary small file metadata 220 plus the small file data itself. In the extreme case of a 0 byte file, for example, the exemplary disclosed small file aggregation approach will use no more than 100 bytes as compared to 4096 bytes in typical file systems.

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for storing a plurality of files generated by a single write process in a parallel computing system, comprising the steps of:

aggregating said plurality of files into a single aggregated file, wherein said plurality of files are generated by said single write process;

generating metadata for said single aggregated file, wherein said metadata comprises an offset and a length of each of said plurality of files in said single aggregated file; and providing said single aggregated file to a file system for storage as a single file with said metadata, wherein said single aggregated file is stored in one level of a file directory comprised of a data file for each of said plurality of files.

2. The method of claim 1, further comprising a plurality of said write processes running on a plurality of compute nodes, and wherein a single aggregated file is generated for each of said write processes.

3. The method of claim 1, wherein said file system is a middleware virtual file system.

4. The method of claim 1, wherein said file system is a parallel file system comprised of one or more disks.

5. The method of claim 1, further comprising the step of unpacking one or more of said files from said single aggregated file using said metadata.

6. The method of claim 1, wherein said metadata characterizes a layout of said files within said single aggregated file.

7. The method of claim 1, wherein a plurality of said files that are in a same directory are aggregated into a single file aggregated container structure.

8. The method of claim 1, further comprising the step of maintaining a name list file, said data file, and an index file for each of said files in said single aggregated file.

9. The method of claim 1, wherein said single aggregated file comprises a number of bytes for said metadata plus data for said plurality of files.

10. The method of claim 1, wherein said metadata further comprises one or more of a timestamp and an identifier of each small file.

11. A computer program product comprising a non-transitory processor-readable recordable storage medium having encoded therein executable code of one or more software programs, wherein the one or more software programs when executed by a processor of a processing device implement the steps of the method of claim 1.

12. An apparatus for storing a plurality of files generated by a single write process in a parallel computing system, comprising:
 a memory; and
 at least one hardware device operatively coupled to the memory and configured to:
 aggregate said plurality of files into a single aggregated file, wherein said plurality of files are generated by said single write process;
 generate metadata for said single aggregated file, wherein said metadata comprises an offset and a length of each of said plurality of files in said single aggregated file; and
 provide said single aggregated file to a file system for storage as a single file with said metadata, wherein said single aggregated file is stored in one level of a file directory comprised of a data file for each of said plurality of files.

13. The apparatus of claim 12, further comprising a plurality of said write processes running on a plurality of compute nodes, and wherein a single aggregated file is generated for each of said write processes.

14. The apparatus of claim 12, wherein said file system is a middleware virtual file system.

15. The apparatus of claim 12, wherein said file system is a parallel file system comprised of one or more disks.

16. The apparatus of claim 12, wherein said at least one hardware device is further configured to unpack one or more of said files from said single aggregated file using said metadata.

17. The apparatus of claim 12, wherein said at least one hardware device is further configured to maintain a name list file, said data file, and an index file for each of said files in said single aggregated file.

18. A data storage system for storing a plurality of files generated by a single write process plurality of processes in a parallel computing system, comprising:
 a hardware processing unit for aggregating said plurality of files into a single aggregated file, wherein said plurality of files are generated by said single write process, and generating metadata for said single aggregated file, wherein said metadata comprises an offset and a length of each of said plurality of files in said single aggregated file; and
 a storage medium for storing said single aggregated file as a single file with said metadata, wherein said single aggregated file is stored in one level of a file directory comprised of a data file for each of said plurality of files.

19. The data storage system of claim 18, wherein said plurality of files are provided to a middleware virtual file system for storage.

20. The data storage system of claim 19, wherein said middleware virtual file system comprises one or more of a parallel log file system and a burst buffer.

21. The data storage system of claim 18, wherein said single aggregated file is stored on a parallel file system comprised of one or more disks.

22. The data storage system of claim 18, wherein said at least one hardware device is further configured to maintain a name list file, said data file, and an index file for each of said files in said single aggregated file.

* * * * *

UNITED STATES PATENT AND TRADEMARK OFFICE
CERTIFICATE OF CORRECTION

PATENT NO. : 8,825,652 B1
APPLICATION NO. : 13/536315
DATED : September 2, 2014
INVENTOR(S) : Sorin Faibish et al.

Page 1 of 1

It is certified that error appears in the above-identified patent and that said Letters Patent is hereby corrected as shown below:

In the drawings,

Sheet 4, Fig. 6, in the result of box 610, after "dropping2" replace "drooping3" with --dropping3--.

Sheet 10, Fig. 10, line 13, after "void *buf" replace "off_t offset size_t length" with --off_t offset, size_t length--.

In the specification,

In column 5, lines 14 and 15, replace the numbers "530-i, 540-i and 550-i" with --530-1, 540-1 and 550-1--.

In column 7, line 16, after "files 530" replace "630" with --620--.

In the claims,

In Claim 18, column 10, line 23, after "process" remove "plurarity of processes.".

Signed and Sealed this
Fifth Day of April, 2016

Michelle K. Lee
*Director of the United States Patent and Trademark Office*